(12) United States Patent
Behzadpour et al.

(10) Patent No.: US 11,377,851 B2
(45) Date of Patent: Jul. 5, 2022

(54) STRINGER AND ASSOCIATED COMPOSITE STRUCTURE AND METHOD FOR REINFORCING A BASE STRUCTURE

(71) Applicant: The Boeing Company, Chicago, IL (US)

(72) Inventors: Forouzan Behzadpour, Woodinville, WA (US); Patrick B. Stickler, Everett, WA (US)

(73) Assignee: The Boeing Company, Chicago, IL (US)

( * ) Notice: Subject to any disclaimer, the term of this patent is extended or adjusted under 35 U.S.C. 154(b) by 81 days.

(21) Appl. No.: 16/782,170

(22) Filed: Feb. 5, 2020

(65) Prior Publication Data
US 2021/0238851 A1     Aug. 5, 2021

(51) Int. Cl.
| | | |
|---|---|---|
| *B64C 1/00* | (2006.01) | |
| *E04C 3/29* | (2006.01) | |
| *B64C 1/06* | (2006.01) | |
| *E04C 3/28* | (2006.01) | |

(52) U.S. Cl.
CPC ............... *E04C 3/29* (2013.01); *B64C 1/064* (2013.01); *B64C 2001/0072* (2013.01); *E04C 3/28* (2013.01)

(58) Field of Classification Search
None
See application file for complete search history.

(56) References Cited

U.S. PATENT DOCUMENTS

| | | | |
|---|---|---|---|
| 9,856,008 B2 | 1/2018 | Cheng et al. | |
| 2010/0139847 A1* | 6/2010 | Law | B29C 70/342 156/182 |
| 2012/0308770 A1* | 12/2012 | Eli-Eli | B64C 1/064 428/120 |
| 2015/0217508 A1* | 8/2015 | Rossi | B29C 33/448 428/80 |
| 2019/0016436 A1 | 1/2019 | Stickler et al. | |
| 2019/0047677 A1 | 2/2019 | Cheng et al. | |

\* cited by examiner

*Primary Examiner* — Alexander S Thomas
(74) *Attorney, Agent, or Firm* — Walters & Wasylyna LLC (57) ABSTRACT

Provided is a stringer having a first stiffener extending along a path and having a first flange portion and a first web portion, wherein the first stiffener is formed from a composite including a fabric reinforcement; a second stiffener extending along the path and having a second flange portion and a second web portion, the first web portion being opposed and spaced from the second web portion, wherein the second stiffener is formed from a composite including a fabric reinforcement; and an intermediate stiffener extending along the path, the intermediate stiffener being positioned between the first web portion and the second web portion, the intermediate stiffener having a first side and a second side, the first side being connected to the first web portion and the second side being connected to the second web portion, wherein the intermediate stiffener is formed from a composite including unidirectional reinforcement fibers.

20 Claims, 3 Drawing Sheets

STRINGER AND ASSOCIATED COMPOSITE STRUCTURE AND METHOD FOR REINFORCING A BASE STRUCTURE

FIELD

The present disclosure generally relates to composite stringers and, more particularly, to hybrid split stringers, composite structures incorporating hybrid split stringers, and methods for reinforcing base structures using hybrid split stringers.

BACKGROUND

Stringers can be manufactured from composite materials. Blade stringers are a commonly used type of composite stringer. However, it has been difficult to incorporate tape plies into composite blade stringers.

Accordingly, those skilled in the art continue with research and development efforts in the field of composite stringers.

SUMMARY

Disclosed are various stringers, composite structures, and methods for reinforcing base structures.

One example of the disclosed stringer includes a first stiffener member extending along a stringer elongation path, the first stiffener member having a first flange portion and a first web portion, wherein the first stiffener member is formed from a first composite material including a first woven fabric reinforcement material; a second stiffener member extending along the stringer elongation path, the second stiffener member having a second flange portion and a second web portion, the first web portion being opposed from and spaced apart from the second web portion, wherein the second stiffener member is formed from a second composite material including a second woven fabric reinforcement material; and an intermediate stiffener member extending along the stringer elongation path, the intermediate stiffener member being positioned at least partially between the first web portion and the second web portion, the intermediate stiffener member having a first side and a second side opposed from the first side, the first side being connected to the first web portion and the second side being connected to the second web portion, wherein the intermediate stiffener member is formed from a third composite material including unidirectional reinforcement fibers.

One example of the disclosed composite structure includes a base structure and a stringer connected to the base structure, the stringer having a first stiffener member extending along a stringer elongation path, the first stiffener member including a first flange portion and a first web portion, wherein the first stiffener member is formed from a first composite material including a first woven fabric reinforcement material, and wherein the first flange portion is connected to the base structure; a second stiffener member extending along the stringer elongation path, the second stiffener member including a second flange portion and a second web portion, the first web portion being opposed from and spaced apart from the second web portion, wherein the second stiffener member is formed from a second composite material including a second woven fabric reinforcement material, and wherein the second flange portion is connected to the base structure; and an intermediate stiffener member extending along the stringer elongation path, the intermediate stiffener member being positioned at least partially between the first web portion and the second web portion, the intermediate stiffener member including a first side and a second side opposed from the first side, the first side being connected to the first web portion and the second side being connected to the second web portion, wherein the intermediate stiffener member is formed from a third composite material including unidirectional reinforcement fibers, wherein the intermediate stiffener member is offset from the base structure by a non-zero offset distance such that a transition region is defined by the intermediate stiffener member, the base structure, the first stiffener member, and the second stiffener member.

One example of the disclosed method for reinforcing a base structure includes connecting to the base structure a stringer having a first stiffener member extending along a stringer elongation path, the first stiffener member comprising a first flange portion and a first web portion, wherein the first stiffener member is formed from a first composite material having a first woven fabric reinforcement material; a second stiffener member extending along the stringer elongation path, the second stiffener member having a second flange portion and a second web portion, the first web portion being opposed from and spaced apart from the second web portion, wherein the second stiffener member is formed from a second composite material having a second woven fabric reinforcement material; and an intermediate stiffener member extending along the stringer elongation path, the intermediate stiffener member being positioned between the first web portion and the second web portion, the intermediate stiffener member having a first side and a second side opposed from the first side, the first side being connected to the first web portion and the second side being connected to the second web portion, wherein the intermediate stiffener member is formed from a third composite material having unidirectional reinforcement fibers.

Other examples of the disclosed stringers, composite structures, and methods for reinforcing base structures will become apparent from the following detailed description, the accompanying drawings and the appended claims.

DETAILED DESCRIPTION

The following detailed description refers to the accompanying drawings, which illustrate specific non-limiting examples of the disclosure. Other examples having different structures and operations do not depart from the scope of the present disclosure. Like reference numerals may refer to the same element or component in the different drawings.

It has been found that for certain composite materials, such as, but not limited to, carbon fiber reinforced polymers (CFRP), fabric plies do well for forming certain curved and angled geometries for which unidirectional CFRP do not do as well. Use of unidirectional plies, such as, but not limited to, tape plies, in substantially flat areas of an assembly in conjunction with fabric in the substantially non-flat areas of the assembly shows promise to improve or maximize strength, while reducing or minimizing defects.

Figure 1:
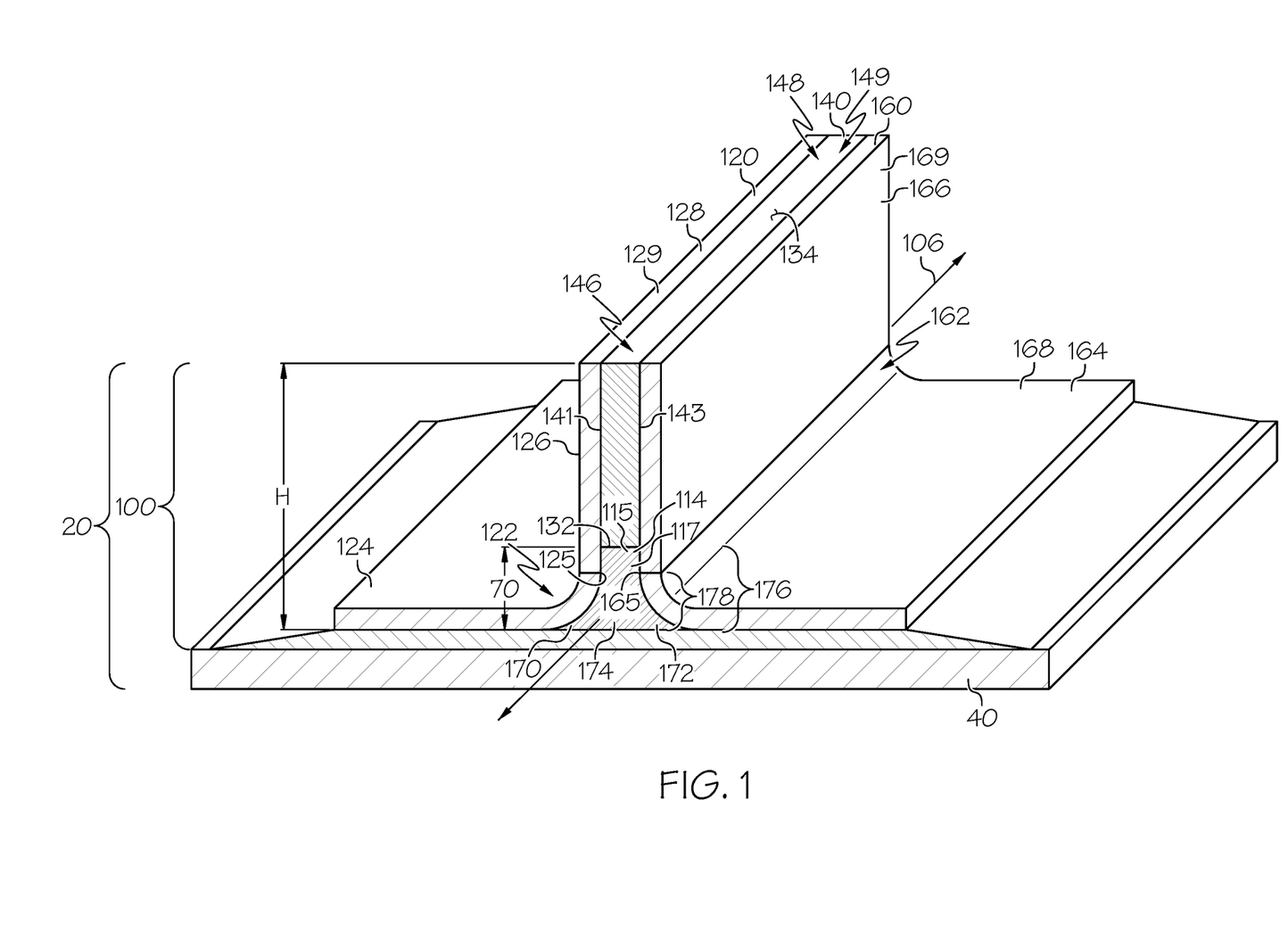
FIG. 1 is a perspective view of one example of the disclosed stringer.

FIG. 1 illustrates a non-limiting first example of a stringer (100). The stringer (100) comprises a first stiffener member (120) extending along a stringer elongation path (106), the first stiffener member (120) comprising a first flange portion (124) and a first web portion (126), wherein the first stiffener member (120) is formed from a first composite material (128) comprising a first woven fabric reinforcement material (129). The stringer (100) further comprises a second stiffener member (160) extending along the stringer elongation path (106), the second stiffener member (160) comprising a second flange portion (164) and a second web portion (166), the first web portion (126) being opposed from and spaced apart from the second web portion (166), wherein the second stiffener member (160) is formed from a second composite material (168) comprising a second woven fabric reinforcement material (169). The stringer (100) further comprises an intermediate stiffener member (140) extending along the stringer elongation path (106), the intermediate stiffener member (140) being positioned at least partially between the first web portion (126) and the second web portion (166), the intermediate stiffener member (140) comprising a first side (141) and a second side (143) opposed from the first side (141), the first side (141) being connected to the first web portion (126) and the second side (143) being connected to the second web portion (166), wherein the intermediate stiffener member (140) is formed from a third composite material (148) comprising unidirectional reinforcement fibers (149).

Figure 4:
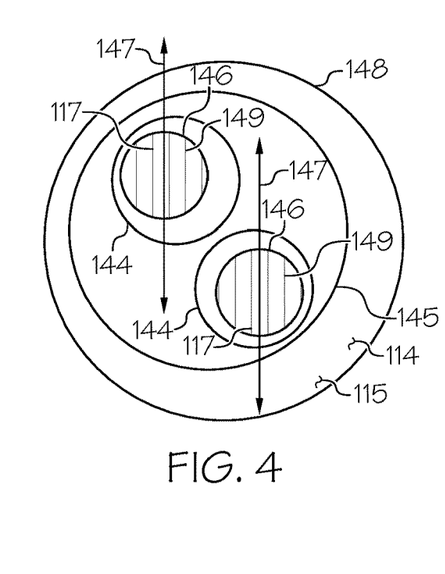
FIG. 4 is a cross-sectional view of a third composite material that may be used in the stringer of FIG. 1.

With reference to FIGS. 1 and 4, in some forms of the first example of the stringer (100), the third composite material (148) may comprise a unidirectional tape reinforcement material (146).

With continued reference to FIGS. 1 and 4, in some forms of the first example of the stringer (100), the third composite material (148) may comprise a polymer matrix (114) and the unidirectional reinforcement fibers (149) may be embedded in the polymer matrix (114). In some non-limiting examples of the latter stringer (100), the polymer matrix (114) comprises a thermoset resin (115), or the unidirectional reinforcement fibers (149) comprise carbon fibers (117), or both.

With continued reference to FIGS. 1 and 4, in some forms of the first example of the stringer (100) the intermediate stiffener member (140) comprises a plurality of plies (145), each ply (144) of the plurality of plies (145) comprises the unidirectional reinforcement fibers (149), and the unidirectional reinforcement fibers (149) in each ply (144) of the plurality of plies (145) defines a fiber orientation (147) for that ply (144) of the plurality of plies (145). In some non-limiting forms of this latter example of the stringer (100), the fiber orientation (147) of at least 40 percent of the plies (144) of the plurality of plies (145) are substantially aligned with the stringer elongation path (106); or the fiber orientation (147) of at least 40 percent of the plies (144) of the plurality of plies (145) are within 15 degrees of alignment with the stringer elongation path (106); or the fiber orientation (147) of at least 5 percent of the plies (144) of the plurality of plies (145) are at an angle of about 40 to about 50 degrees relative to the stringer elongation path (106), the fiber orientation (147) of at least 5 percent of the plies (144) of the plurality of plies (145) are at an angle of about 85 to about 95 degrees relative to the stringer elongation path (106), and the fiber orientation (147) of at least 50 percent of the plies (144) of the plurality of plies (145) are within 5 degrees of alignment with the stringer elongation path (106). In some non-limiting forms of this latter example of the stringer (100), the fiber orientation (147) of at least 50 percent of the plies (144) of the plurality of plies (145) are substantially aligned with the stringer elongation path (106). In some non-limiting forms of this latter example of the stringer (100), the fiber orientation (147) of at least 60 percent of the plies (144) of the plurality of plies (145) are substantially aligned with the stringer elongation path (106). In some non-limiting forms of this latter example of the stringer (100), the fiber orientation (147) of at least 70 percent of the plies (144) of the plurality of plies (145) are substantially aligned with the stringer elongation path (106). In some non-limiting forms of this latter example of the stringer (100), the fiber orientation (147) of at least 80 percent of the plies (144) of the plurality of plies (145) are substantially aligned with the stringer elongation path (106). In some non-limiting forms of this latter example of the stringer (100), the fiber orientation (147) of at least 90 percent of the plies (144) of the plurality of plies (145) are substantially aligned with the stringer elongation path (106). In some non-limiting forms of this latter example of the stringer (100), the fiber orientation (147) of at least 50 percent of the plies (144) of the plurality of plies (145) are within 15 degrees of alignment with the stringer elongation path (106). In some non-limiting forms of this latter example of the stringer (100), the fiber orientation (147) of at least 60 percent of the plies (144) of the plurality of plies (145) are within 15 degrees of alignment with the stringer elongation path (106). In some non-limiting forms of this latter example of the stringer (100), the fiber orientation (147) of at least 70 percent of the plies (144) of the plurality of plies (145) are within 15 degrees of alignment with the stringer elongation path (106). In some non-limiting forms of this latter example of the stringer (100), the fiber orientation (147) of at least 80 percent of the plies (144) of the plurality of plies (145) are within 15 degrees of alignment with the stringer elongation path (106). In some non-limiting forms of this latter example of the stringer (100), the fiber orientation (147) of at least 90 percent of the plies (144) of the plurality of plies (145) are within 15 degrees of alignment with the stringer elongation path (106). In some non-limiting forms of this latter example of the stringer (100), the fiber orientation (147) of at least 50 percent of the plies (144) of the plurality of plies (145) are within 5 degrees of alignment with the stringer elongation path (106). In some non-limiting forms of this latter example of the stringer (100), the fiber orientation (147) of at least 60 percent of the plies (144) of the plurality of plies (145) are within 5 degrees of alignment with the stringer elongation path (106). In some non-limiting forms of this latter example of the stringer (100), the fiber orientation (147) of at least 70 percent of the plies (144) of the plurality of plies (145) are within 5 degrees of alignment with the stringer elongation path (106). In some non-limiting forms of this latter example of the stringer (100), the fiber orientation (147) of at least 80 percent of the plies (144) of the plurality of plies (145) are within 5 degrees of alignment with the stringer elongation path (106). In some non-limiting forms of this latter example of the stringer (100), the fiber orientation (147) of at least 90 percent of the plies (144) of the plurality of plies (145) are within 5 degrees of alignment with the stringer elongation path (106). In some non-limiting forms of this latter example of the stringer (100), the fiber orientation (147) of at least 5 percent of the plies (144) of the plurality of plies (145) are at an angle of about 40 to about 50 degrees relative to the stringer elongation path (106), the fiber orientation (147) of at least 5 percent of the plies (144) of the plurality of plies (145) are at an angle of about 85 to about 95 degrees relative to the stringer elongation path (106), and the fiber orientation (147) of at least 50 percent of the plies (144) of the plurality of plies (145) are within 5 degrees of alignment with the stringer elongation path (106). In some non-limiting forms of this latter example of the stringer (100), the fiber orientation (147) of at least 5 percent of the plies (144) of the plurality of plies (145) are at an angle of about 42 to about 48 degrees relative to the stringer elongation path (106), the fiber orientation (147) of at least 5 percent of the plies (144) of the plurality of plies (145) are at an angle of about 88 to about 92 degrees relative to the stringer elongation path (106), and the fiber orientation (147) of at least 60 percent of the plies (144) of the plurality of plies (145) are within 5 degrees of alignment with the stringer elongation path (106). In some non-limiting forms of this latter example of the stringer (100), the fiber orientation (147) of at least 5 percent of the plies (144) of the plurality of plies (145) are at an angle of about 42 to about 48 degrees relative to the stringer elongation path (106), the fiber orientation (147) of at least 5 percent of the plies (144) of the plurality of plies (145) are at an angle of about 88 to about 92 degrees relative to the stringer elongation path (106), and the fiber orientation (147) of at least 70 percent of the plies (144) of the plurality of plies (145) are within 5 degrees of alignment with the stringer elongation path (106). In some non-limiting forms of this latter example of the stringer (100), the fiber orientation (147) of at least 5 percent of the plies (144) of the plurality of plies (145) are at an angle of about 42 to about 48 degrees relative to the stringer elongation path (106), the fiber orientation (147) of at least 5 percent of the plies (144) of the plurality of plies (145) are at an angle of about 88 to about 92 degrees relative to the stringer elongation path (106), and the fiber orientation (147) of at least 80 percent of the plies (144) of the plurality of plies (145) are within 5 degrees of alignment with the stringer elongation path (106).

Figure 2:
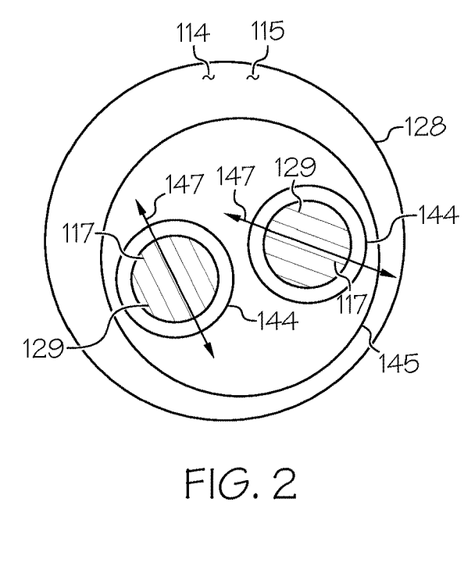
FIG. 2 is a cross-sectional view of a first composite material that may be used in the stringer of FIG. 1.

With reference to FIGS. 1 and 2, in some forms of the first example of the stringer (100) the first composite material (128) comprises a polymer matrix (114) and the first woven fabric reinforcement material (129) embedded in the polymer matrix (114). In some non-limiting forms of this latter example of the stringer (100), the polymer matrix (114) comprises a thermoset resin (115), or the first woven fabric reinforcement material (129) comprises carbon fibers (117), or both.

With continued reference to FIGS. 1 and 2, in some forms of the first example of the stringer (100) the first stiffener member (120) comprises a plurality of plies (145), and each ply (144) of the plurality of plies (145) comprises the first woven fabric reinforcement material (129). In some non-limiting forms of this latter example of the stringer (100), at least two plies (144) of the plurality of plies (145) have different fiber orientations (147).

Figure 3:
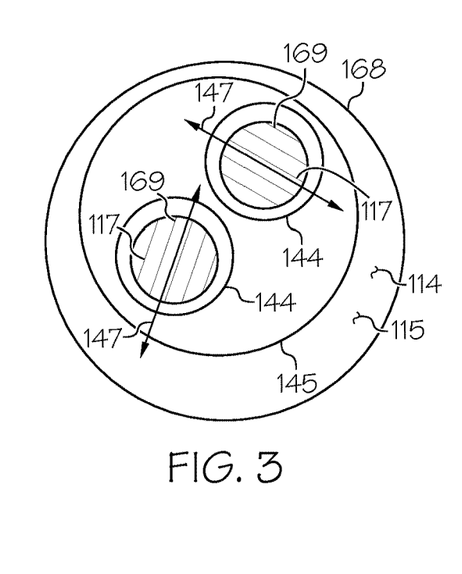
FIG. 3 is a cross-sectional view of a second composite material that may be used in the stringer of FIG. 1.

With reference to FIGS. 1 and 3, in some forms of the first example of the stringer (100) the second composite material (168) comprises a polymer matrix (114), and the second woven fabric reinforcement material (169) embedded in the polymer matrix (114). In some non-limiting forms of this latter example of the stringer (100), the polymer matrix (114) comprises a thermoset resin (115), or the second woven fabric reinforcement material (169) comprises carbon fibers (117), or both.

With continued reference to FIGS. 1 and 3, in some forms of the first example of the stringer (100), the second stiffener member (160) comprises a plurality of plies (145), and each ply (144) of the plurality of plies (145) comprises the second woven fabric reinforcement material (169). In some non-limiting forms of this latter example of the stringer (100), at least two plies (144) of the plurality of plies (145) have different fiber orientations (147).

With reference to FIG. 1-3, in some forms of the first example of the stringer (100), the first composite material (128) is substantially the same as the second composite material (168).

With reference to FIG. 1, some forms of the first example of the stringer (100), further comprise a filler member (170), wherein the first stiffener member (120), the second stiffener member (160), and the intermediate stiffener member (140) define a transition region (176), and wherein the filler member (170) is positioned in the transition region (176). In some non-limiting forms of this latter example of the stringer (100), the filler member (170) comprises a fourth composite material (172) comprising a polymer matrix (114) and chopped fibers (174) embedded in the polymer matrix (114). In some non-limiting forms of this latter example of the stringer (100), the polymer matrix (114) may comprise a thermoset resin (115), or the chopped fibers (174) may comprise carbon fibers (117), or both.

With continued reference to FIG. 1, in some forms of the first example of the stringer (100), every portion of the first side (141) of the intermediate stiffener member (140) is between the first web portion (126) and the second web portion (166), and every portion of the second side (143) of the intermediate stiffener member (140) is between the first web portion (126) and the second web portion (166).

With continued reference to FIG. 1, in some forms of the first example of the stringer (100), the intermediate stiffener member (140) further comprises: a third side (132) connecting the first side (141) and the second side (143); and a fourth side (134) opposite the third side (132), wherein the third side (132) is more proximate the first flange portion (124) and the second flange portion (164) than is the fourth side (134). In some non-limiting forms of this latter example of the stringer (100), the first stiffener member (120) further comprises a first curved portion (122) between the first flange portion (124) and the first web portion (126), the second stiffener member (160) further comprises a second curved portion (162) between the second flange portion (164) and the second web portion (166), and the first curved portion (122) and the second curved portion (162) define therebetween a tapering region (178). In some non-limiting forms of this latter example of the stringer (100): the third side (132) of the intermediate stiffener member (140) does not extend into the tapering region (178), and the fourth side (134) of the intermediate stiffener member (140) does not extend into the tapering region (178); or a first tangency boundary (125) is defined between the first curved portion (122) and the first web portion (126), a second tangency boundary (165) is defined between the second curved portion (162) and the second web portion (166), and the intermediate stiffener member (140) does not extend between the first tangency boundary (125) and the second tangency boundary (165); or both.

FIG. 1 illustrates a non-limiting first example of a composite structure (20). In some non-limiting examples, a first composite structure may comprise a base structure (40) and a stringer (100) connected to the base structure (40). The stringer (100) may comprise: a first stiffener member (120) extending along a stringer elongation path (106), the first stiffener member (120) comprising a first flange portion (124) and a first web portion (126), wherein the first stiffener member (120) is formed from a first composite material (128) comprising a first woven fabric reinforcement material (129), and wherein the first flange portion (124) is connected to the base structure (40); a second stiffener member (160) extending along the stringer elongation path (106), the second stiffener member (160) comprising a second flange portion (164) and a second web portion (166), the first web portion (126) being opposed from and spaced apart from the second web portion (166), wherein the second stiffener member (160) is formed from a second composite material (168) comprising a second woven fabric reinforcement material (169), and wherein the second flange portion (164) is connected to the base structure (40); and an intermediate stiffener member (140) extending along the stringer elongation path (106), the intermediate stiffener member (140) being positioned at least partially between the first web portion (126) and the second web portion (166), the intermediate stiffener member (140) comprising a first side (141) and a second side (143) opposed from the first side (141), the first side (141) being connected to the first web portion (126) and the second side (143) being connected to the second web portion (166), wherein the intermediate stiffener member (140) is formed from a third composite material (148) comprising unidirectional reinforcement fibers (149), wherein the intermediate stiffener member (140) is offset from the base structure (40) by a non-zero offset distance (70) such that a transition region (176) is defined by the intermediate stiffener member (140), the base structure (40), the first stiffener member (120), and the second stiffener member (160).

With continued reference to FIGS. 1 and 3, in some forms of the first example of the composite structure (20), the third composite material (148) comprises a unidirectional tape reinforcement material (146).

With continued reference to FIGS. 1 and 3, in some forms of the first example of the composite structure (20), the intermediate stiffener member (140) comprises a plurality of plies (145), each ply (144) of the plurality of plies (145) comprises the unidirectional reinforcement fibers (149), and the unidirectional reinforcement fibers (149) in each ply (144) of the plurality of plies (145) defines a fiber orientation (147) for that ply (144) of the plurality of plies (145). In some non-limiting forms of this latter example of the composite structure (20), the fiber orientation (147) of at least 40 percent of the plies of the plurality of plies (145) are substantially aligned with the stringer elongation path (106). In some non-limiting forms of this latter example of the composite structure (20), the fiber orientation (147) of at least 50 percent of the plies of the plurality of plies (145) are substantially aligned with the stringer elongation path (106). In some non-limiting forms of this latter example of the composite structure (20), the fiber orientation (147) of at least 60 percent of the plies of the plurality of plies (145) are substantially aligned with the stringer elongation path (106). In some non-limiting forms of this latter example of the composite structure (20), the fiber orientation (147) of at least 70 percent of the plies of the plurality of plies (145) are substantially aligned with the stringer elongation path (106). In some non-limiting forms of this latter example of the composite structure (20), the fiber orientation (147) of at least 80 percent of the plies of the plurality of plies (145) are substantially aligned with the stringer elongation path (106). In some non-limiting forms of this latter example of the composite structure (20), the fiber orientation (147) of at least 90 percent of the plies of the plurality of plies (145) are substantially aligned with the stringer elongation path (106).

With reference to FIG. 1-4, in some forms of the first example of the composite structure (20): the third composite material (148) comprises a polymer matrix (114) and carbon fibers (117) embedded in the polymer matrix (114), or the first composite material (128) is substantially the same as the second composite material (168), or the composite structure (20) further comprises a filler member (170) that fills the transition region (176), or some combination thereof.

With continued reference to FIG. 1, in those forms of the first example of the composite structure (20) further comprising a filler member (170) that fills the transition region (176), the filler member (170) may comprise a fourth composite material (172) comprising a polymer matrix (114) and chopped carbon fibers (117) embedded in the polymer matrix (114).

With continued reference to FIG. 1, in some forms of the first example of the composite structure (20): the first side (141) of the intermediate stiffener member (140) abuts the first web portion (126), and the second side (143) of the intermediate stiffener member (140) abuts the second web portion (166); or the offset distance (70) is at least 1 centimeter; or the stringer (100) has a maximum height H, and the offset distance (70) is at least 5 percent of the maximum height H; or some combination thereof. In some forms of the first example of the composite structure (20) the offset distance (70) is at least 2 centimeters. In some forms of the first example of the composite structure (20) the offset distance (70) is at least 3 centimeters. In some forms of the first example of the composite structure (20) the offset distance (70) is at least 4 centimeters. In some forms of the first example of the composite structure (20) the offset distance (70) is at least 5 centimeters. In some forms of the first example of the composite structure (20) the offset distance (70) is more than 5 centimeters. In some forms of the first example of the composite structure (20) the stringer (100) has a maximum height H, and the offset distance (70) is at least 8 percent of the maximum height H. In some forms of the first example of the composite structure (20) the stringer (100) has a maximum height H, and the offset distance (70) is at least 10 percent of the maximum height H. In some forms of the first example of the composite structure (20) the stringer (100) has a maximum height H, and the offset distance (70) is at least 12 percent of the maximum height H. In some forms of the first example of the composite structure (20) the stringer (100) has a maximum height H, and the offset distance (70) is at least 15 percent of the maximum height H. In some forms of the first example of the composite structure (20) the stringer (100) has a maximum height H, and the offset distance (70) is at least 18 percent of the maximum height H. In some forms of the first example of the composite structure (20) the stringer (100) has a maximum height H, and the offset distance (70) is more than 18 percent of the maximum height H.

FIG. 1 illustrates a non-limiting first method for reinforcing a base structure (40). In some non-limiting examples, a first method for reinforcing a base structure (40) comprises connecting to the base structure (40) a stringer (100) comprising: a first stiffener member (120) extending along a stringer elongation path (106), the first stiffener member (120) comprising a first flange portion (124) and a first web portion (126), wherein the first stiffener member (120) is formed from a first composite material (128) comprising a first woven fabric reinforcement material (129); a second stiffener member (160) extending along the stringer elongation path (106), the second stiffener member (160) comprising a second flange portion (164) and a second web portion (166), the first web portion (126) being opposed from and spaced apart from the second web portion (166), wherein the second stiffener member (160) is formed from a second composite material (168) comprising a second woven fabric reinforcement material (169); and an intermediate stiffener member (140) extending along the stringer elongation path (106), the intermediate stiffener member (140) being positioned between the first web portion (126) and the second web portion (166), the intermediate stiffener member (140) comprising a first side (141) and a second side (143) opposed from the first side (141), the first side (141) being connected to the first web portion (126) and the second side (143) being connected to the second web portion (166), wherein the intermediate stiffener member (140) is formed from a third composite material (148) comprising unidirectional reinforcement fibers (149). In some non-limiting forms of this latter first method for reinforcing a base structure (40), the connecting comprises co-curing the base structure (40) with the stringer (100), or the connecting comprises co-bonding the base structure (40) with the stringer (100).

In certain non-limiting examples, the first flange portion (124) may be sufficiently thin relative to the first web portion (126) to reduce or eliminate the need for chamfering of flange ends, and to reduce or eliminate flange free edge interlaminar stresses. In certain non-limiting examples, the second flange portion (164) may be sufficiently thin relative to the second web portion (166) to reduce or eliminate the need for chamfering of flange ends, and to reduce or eliminate flange free edge interlaminar stresses.

It should be understood in the foregoing that the stringer elongation path (106) and other paths, directions, and orientations need not be perfectly linear, and that slight curvature of the stringer elongation path (106) and other paths, directions, and orientations is acceptable and contemplated. Where the stringer elongation path (106) and/or other paths, directions, or orientations are slightly curved, measurement of alignment between the stringer elongation path (106) and/or other paths, directions, or orientations should be made using local tangents of the stringer elongation path (106) and/or other paths, directions, or orientations.

Figure 5:
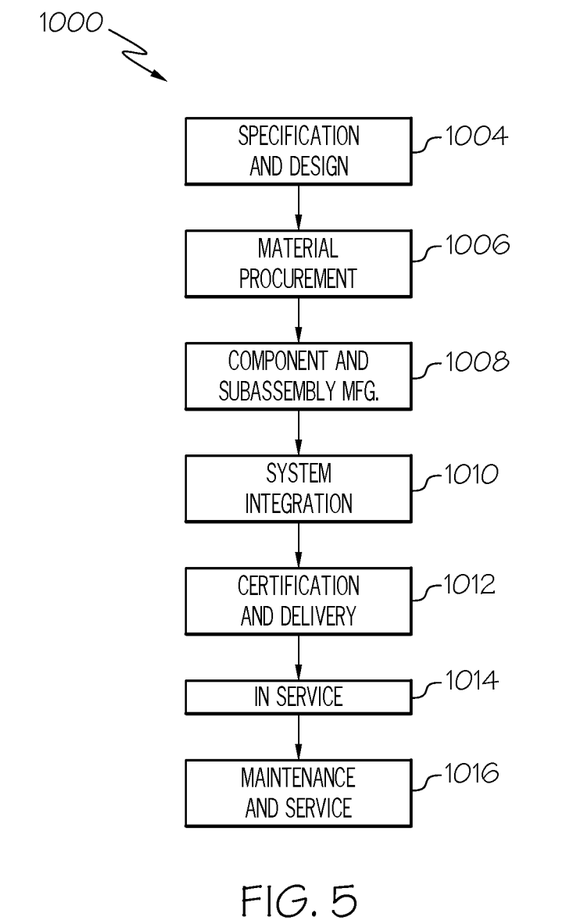
FIG. 5 is a flow diagram of an aircraft manufacturing and service methodology.
Figure 6:
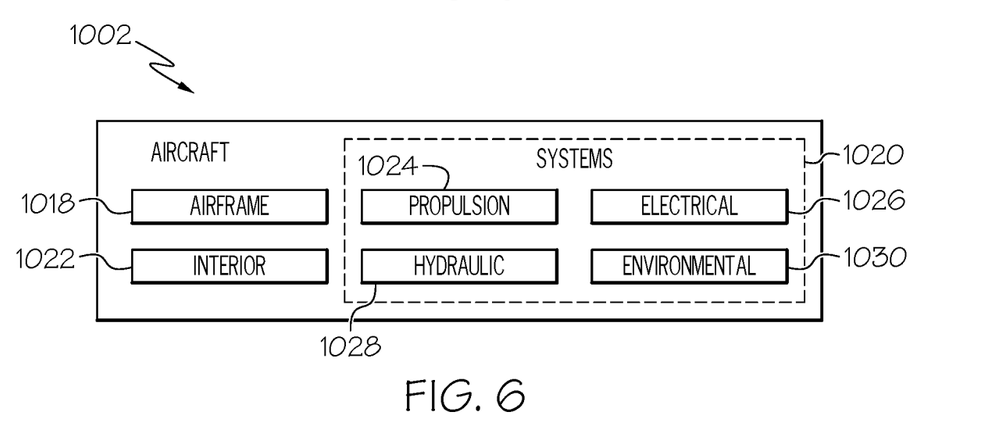
FIG. 6 is a block diagram of an aircraft.

Examples of the disclosure may be described in the context of an aircraft manufacturing and service method 1000, as shown in FIG. 5, and an aircraft 1002, as shown in FIG. 6. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed stringers, composite structures, and methods for reinforcing base structures may be employed during any one or more of the stages of the aircraft manufacturing and service method 1000. As one example, the disclosed stringers, composite structures, and methods for reinforcing base structures may be employed during material procurement 1006. As another example, components or subassemblies corresponding to component/subassembly manufacturing 1008, system integration 1010, and or maintenance and service 1016 may be fabricated or manufactured using the disclosed stringers, composite structures, and methods for reinforcing base structures. As another example, the airframe 1018 and the interior 1022 may be constructed using the disclosed stringers, composite structures, and methods for reinforcing base structures. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed stringers, composite structures, and methods for reinforcing base structures are described in the context of an aircraft; however, one of ordinary skill in the art will readily recognize that the disclosed stringers, composite structures, and methods for reinforcing base structures may be utilized for a variety of applications. For example, the disclosed stringers, composite structures, and methods for reinforcing base structures may be implemented in various types of vehicles, including, for example, helicopters, passenger ships, automobiles and the like.

Although various examples of the disclosed stringers, composite structures, and methods for reinforcing base structures have been shown and described, modifications may occur to those skilled in the art upon reading the specification. The present application includes such modifications and is limited only by the scope of the claims.

What is claimed is:

1. A stringer comprising:
a first stiffener member extending along a stringer elongation path, wherein:
the first stiffener member comprises a first flange portion, a first web portion, and a first transition portion extending between the first flange portion and the first web portion; and
the first stiffener member is formed from a first fiber-reinforced composite material;
a second stiffener member extending along the stringer elongation path, wherein:
the second stiffener member comprises a second flange portion, opposed to and spaced away from the first flange portion, a second web portion, opposed to and spaced away from the first web portion, and a second transition portion, extending between the second flange portion and the second web portion and opposed to and spaced apart from the first transition portion;
the second stiffener member is formed from a second fiber-reinforced composite material; and
an intermediate stiffener member extending along the stringer elongation path, wherein:
an entirety of the intermediate stiffener member is positioned between the first web portion and the second web portion such that a transition region is formed between at least the intermediate stiffener member, the first transition portion, and the second transition portion;

the intermediate stiffener member is formed from a third fiber-reinforced composite material; and the intermediate stiffener member is coupled to the first web portion and to the second web portion.

2. The stringer of claim 1 wherein the third fiber-reinforced composite material comprises a unidirectional tape reinforcement material.

3. The stringer of claim 1 wherein:
the intermediate stiffener member comprises a plurality of plies,
each ply of the plurality of plies comprises unidirectional reinforcement fibers, and
the unidirectional reinforcement fibers in each ply of the plurality of plies defines a fiber orientation for that ply of the plurality of plies.

4. The stringer of claim 3 wherein the fiber orientation of at least 40 percent of the plies of the plurality of plies is substantially aligned with the stringer elongation path.

5. The stringer of claim 3 wherein:
the fiber orientation of at least 5 percent of the plies of the plurality of plies is at an angle of about 40 to about 50 degrees relative to the stringer elongation path,
the fiber orientation of at least 5 percent of the plies of the plurality of plies is at an angle of about 85 to about 95 degrees relative to the stringer elongation path, and
the fiber orientation of at least 50 percent of the plies of the plurality of plies is within 5 degrees of alignment with the stringer elongation path.

6. The stringer of claim 1 wherein:
the first stiffener member comprises a plurality of plies, and
each ply of the plurality of plies comprises a first woven fabric reinforcement material embedded in a first polymer matrix.

7. The stringer of claim 6 wherein at least two plies of the plurality of plies have different fiber orientations.

8. The stringer of claim 1 wherein:
the second stiffener member comprises a plurality of plies, and
each ply of the plurality of plies comprises a second woven fabric reinforcement material embedded in a second polymer matrix.

9. The stringer of claim 8 wherein at least two plies of the plurality of plies have different fiber orientations.

10. The stringer of claim 1 wherein the first first-reinforced composite material is substantially the same as the second fiber-reinforced composite material.

11. The stringer of claim 1 further comprising a filler member extending along the stringer elongation path, wherein:
the filler member fills an entirety of the transition region;
the filler member is formed from a fourth fiber-reinforced composite material.

12. The stringer of claim 11 wherein the fourth fiber-reinforced composite material comprises a polymer matrix and chopped fibers embedded in the polymer matrix.

13. The stringer of claim 11, wherein:
the first fiber-reinforced composite material and the second fiber-reinforced composite material are substantially the same;
the third fiber-reinforced composite material is different than the first fiber-reinforced composite material and the second fiber-reinforced composite material; and the fourth fiber-reinforced composite material is different than the first fiber-reinforced composite material, the second fiber-reinforced composite material, and the third fiber-reinforced composite material.

14. The stringer of claim 11, wherein the filler member is coupled to at least the intermediate stiffener member, the first transition portion, and the second transition portion.

15. The stringer of claim 1 wherein the intermediate stiffener member further comprises:
a first side connected to the first web portion; and
a second side opposed the first side and connected to the second web portion;
a third side extending between the first web portion and the second web portion; and
a fourth side opposite the third side and extending between the first web portion and the second web portion,
wherein:
the third side is more proximate the first flange portion and the second flange portion than is the fourth side; and
the third side is offset from the first flange portion and the second flange portion by a non-zero offset distance.

16. The stringer of claim 1 wherein:
the first transition portion is curved;
the second transition portion is curved; and
the first transition portion and the second transition portion define a tapering region of the stringer.

17. The stringer of claim 16 wherein:
a first tangency boundary is defined between the first transition portion and the first web portion,
a second tangency boundary is defined between the second transition portion and the second web portion, and
the intermediate stiffener member does not extend between the first tangency boundary and the second tangency boundary.

18. A composite structure comprising:
a base structure; and
a stringer connected to the base structure, the stringer comprising:
a first stiffener member extending along a stringer elongation path, wherein:
the first stiffener member comprises a first flange portion, a first web portion, and a first transition portion extending between the first flange portion and the first web portion;
the first stiffener member is formed from a first composite material comprising a first woven fabric reinforcement material; and
the first flange portion is connected to the base structure;
a second stiffener member extending along the stringer elongation path, wherein:
the second stiffener member comprises a second flange portion, opposed to and spaced away from the first flange portion, a second web portion, opposed to and spaced apart from the second web portion, and a second transition portion, extending between the second flange portion and the second wen portion and opposed to and spaced away from the first transition portion;
the second stiffener member is formed from a second composite material comprising a second woven fabric reinforcement material; and
the second flange portion is connected to the base structure; and an intermediate stiffener member extending along the stringer elongation path, wherein:
the intermediate stiffener member is formed from a third composite material comprising unidirectional reinforcement fibers;
an entirety of the intermediate stiffener member is positioned between the first web portion and the second web portion and is offset from the base structure by a non-zero offset distance such that a transition region is formed between the at least the intermediate stiffener member, the first transition portion, the second transition portion, and the base structure;
the intermediate stiffener member is connected to the first web portion and to the second web portion; and
a filler member extending along the stringer elongation path, wherein:
the filler member fills an entirety of the transition region;
the filler member is formed from a fourth composite material comprising chopped reinforcement fibers; and
the filler member is connected to at least the intermediate stiffener member, the first transition portion, the second transition portion, and the base structure.

19. A method for reinforcing a base structure comprising:
connecting to the base structure a stringer, the stringer comprising:
a first stiffener member extending along a stringer elongation path, wherein:
the first stiffener member comprises a first flange portion, a first web portion, and a first transition portion extending between the first flange portion and the first web portion; and
the first stiffener member is formed from a first composite material;
a second stiffener member extending along the stringer elongation path, wherein:
the second stiffener member comprises a second flange portion, a second web portion, and a second transition portion extending between the second flange portion and the second web portion;
the second stiffener member is formed from a second composite material;
the first web portion is opposed to and is spaced apart from the second web portion;
the first transition portion is opposed to and is spaced away from the second transition portion;
the first flange portion is opposed to and is spaced away from the second flange portion; and
the first flange portion and the second flange portion are connected to the base structure;
an intermediate stiffener member extending along the stringer elongation path, wherein:
the intermediate stiffener member is formed from a third composite material;
an entirety of the intermediate stiffener member is positioned between the first web portion and the second web portion;
the intermediate stiffener member is connected to the first web portion and the second web portion; and
the intermediate stiffener member is offset from the base structure by a non-zero offset distance such that a transition region is formed between at least the intermediate stiffener member, the first transition portion, the second transition portion, and the base structure; and
a filler member extending along the stringer elongation path, wherein:
the filler member fills an entirety of the transition region and is connected to at least the intermediate stiffener member, the first transition portion, the second transition portion, and the base structure; and
the filler member comprises a fourth composite material.

20. The method of claim 19, wherein:
the first composite material and the second composite material are substantially the same;
the third composite material is different than the first composite material and the second composite material; and
the fourth composite material is different than the first composite material, the second composite material, and the third composite material.

* * * * *